United States Patent [19]

Smith, Jr. et al.

[11] Patent Number: 4,686,948

[45] Date of Patent: Aug. 18, 1987

[54] HEAD FOR HIGH PERFORMANCE INTERNAL COMBUSTION ENGINE

[75] Inventors: Richard W. Smith, Jr.; Michael E. Smith, both of Wooster, Ohio

[73] Assignee: TFS, Inc., Wooster, Ohio

[21] Appl. No.: 759,747

[22] Filed: Jul. 29, 1985

[51] Int. Cl.⁴ .............................................. F02B 23/08
[52] U.S. Cl. .......................... 123/193 H; 123/188 M; 123/306; 123/661
[58] Field of Search ............... 123/193 R, 193 H, 661, 123/188 M, 188 S, 306

[56] References Cited

U.S. PATENT DOCUMENTS

| | | | |
|---|---|---|---|
| 2,770,227 | 11/1956 | Haigh et al. | 123/661 |
| 3,766,900 | 10/1973 | Aiti | 123/193 H |
| 4,159,011 | 6/1979 | Sperry | 123/193 H |
| 4,289,099 | 9/1981 | Makanishi et al. | 123/193 H |
| 4,344,407 | 8/1982 | Konishi et al. | 123/661 |
| 4,367,707 | 1/1983 | Suzuki | 123/193 H |
| 4,570,585 | 2/1986 | Hayashi | 123/188 S |

Primary Examiner—Craig R. Feinberg
Attorney, Agent, or Firm—Body, Vickers & Daniels

[57] ABSTRACT

An improvement in a cast head for a high performance internal combustion engine having a flat mounting surface for each of several in-line circular piston areas, a wedge type combustion chamber extending from the head mounting surface and defined by a flat quenching surface and a concave, contoured wedge-shaped cavity forming surface. This wedge-shaped cavity tapers outwardly from the quenching surface between a shallower portion adjacent the quenching surface to a deeper portion in which the valves are located. The cavity forming surface of the deeper area of the combustion chamber being provided with a general contour defined by two parallel intersecting, truncated cones generally concentric to the two valve openings in the wedge-shaped combustion chamber with a gradually contoured surface section between the cones at the deeper area of the combustion chamber and a velocity increasing protuberance in the combustion chamber at the shallower portion of the cavity which protuberance includes a curved edge portion of the flat quenching surface, which edge portion extends inwardly of the wedge shaped cavity toward a position between the two valve seats and a built up mass of cast material sloping from the curved edge of the quenching surface toward the valve seats to guide gases from the combustion chamber through the exhaust outlet primarily and, to a lesser extent from the intake inlet into the combustion chamber. This mass of material increases velocity through the exhaust port during the engine exhaust cycle.

19 Claims, 30 Drawing Figures (INTAKE)

(EXHAUST)

(EXHAUST)

(EXHAUST)

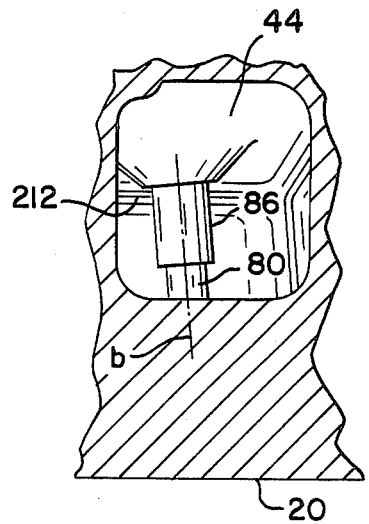
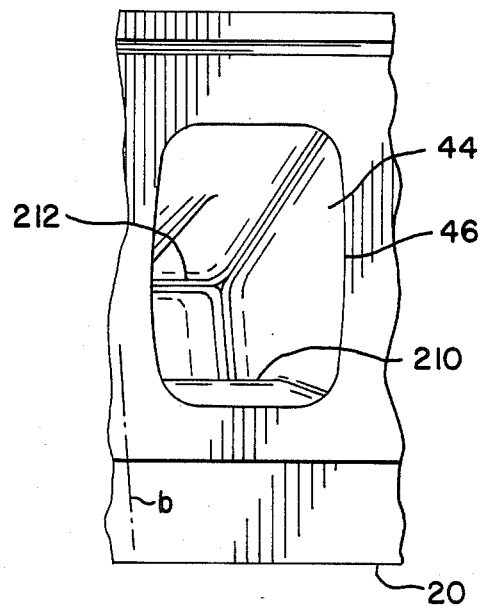
FIG. 14 (INTAKE)
FIG. 15 (INTAKE)
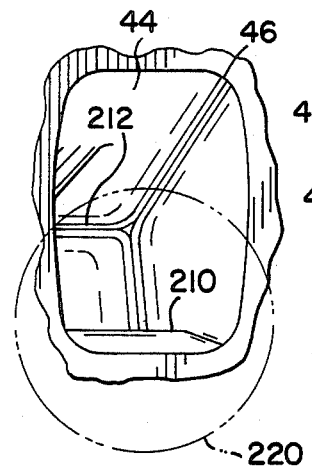
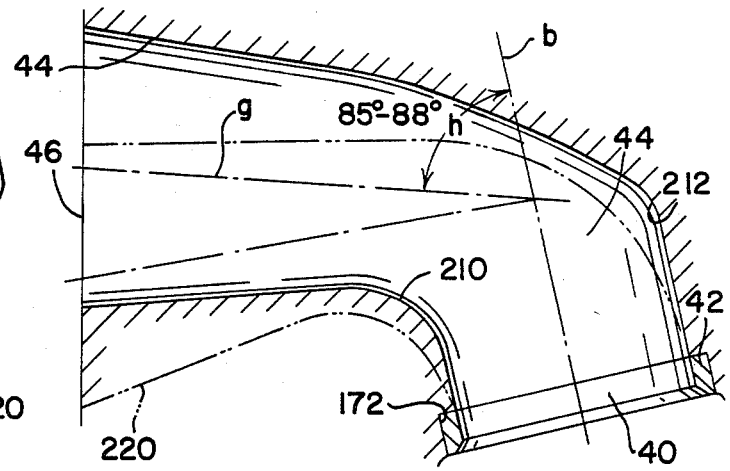
FIG. 16 (INTAKE)
FIG. 17 (INTAKE)

(INTAKE)

(EXHAUST)

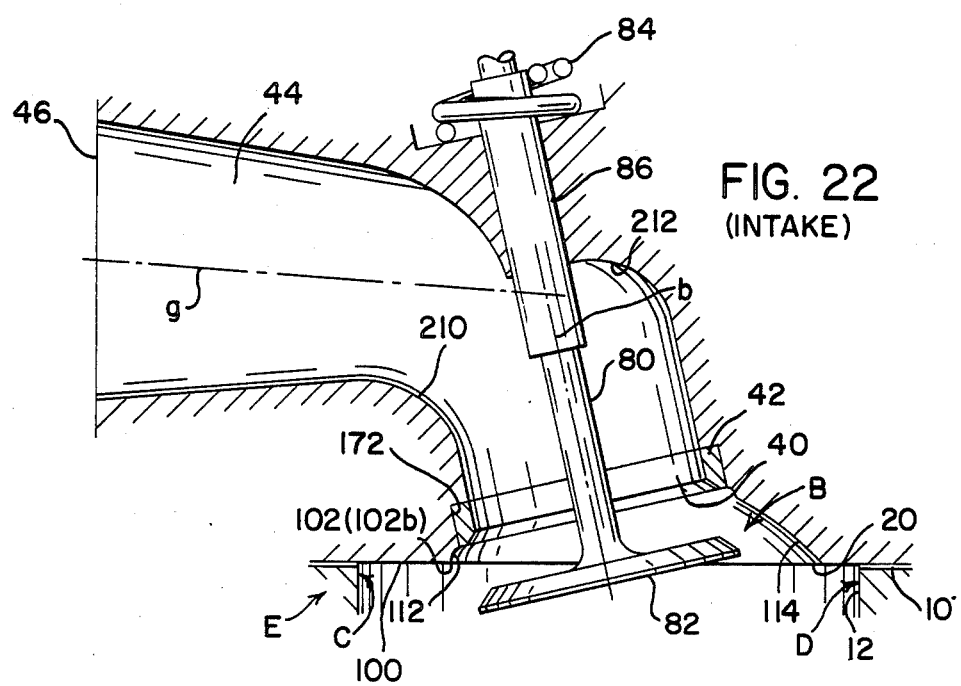
FIG. 22 (INTAKE)
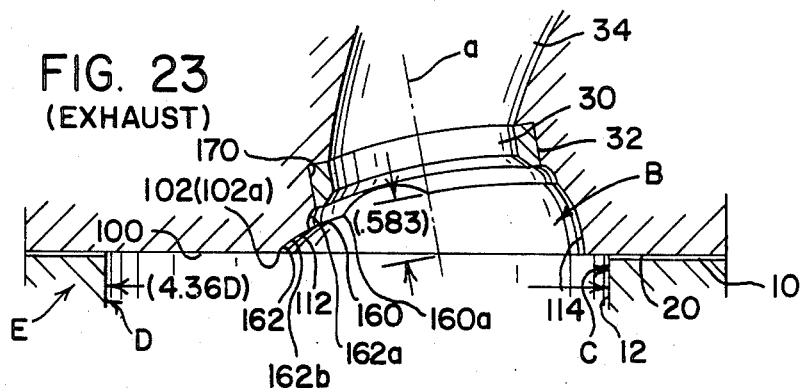
FIG. 23 (EXHAUST)
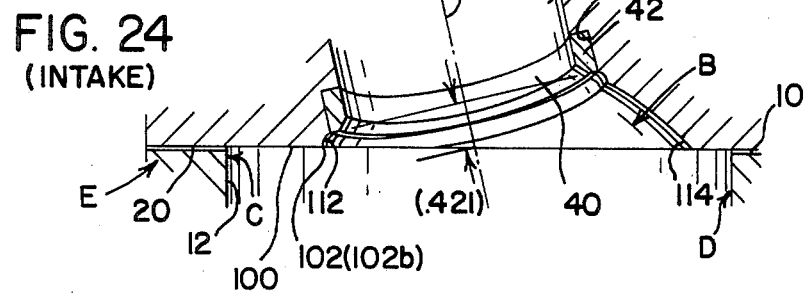
FIG. 24 (INTAKE)

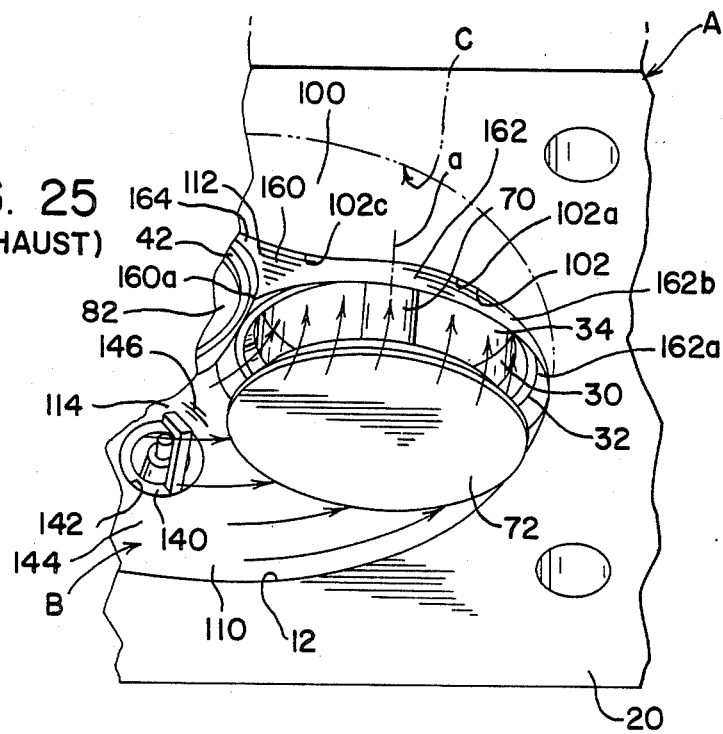
FIG. 25 (EXHAUST)
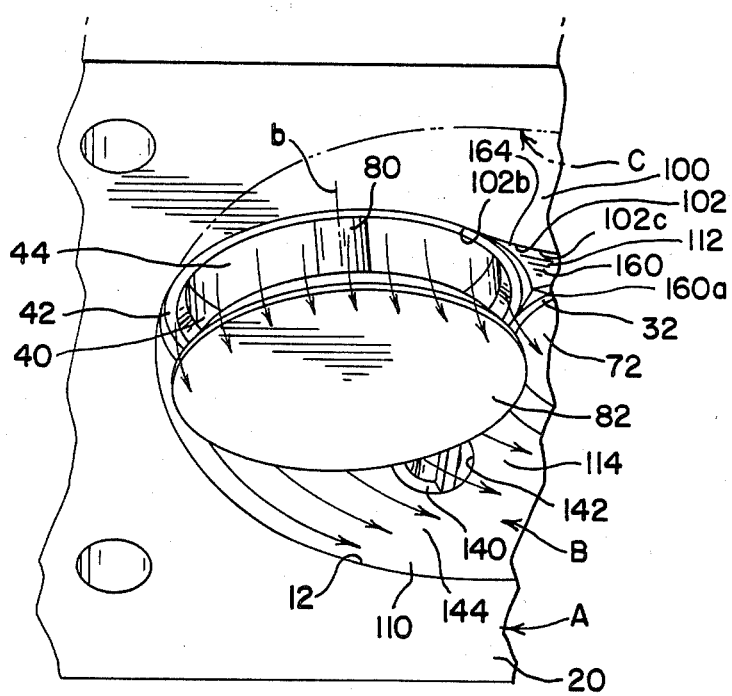
FIG. 26 (INTAKE)

HEAD FOR HIGH PERFORMANCE INTERNAL COMBUSTION ENGINE

The present invention relates to the art of high performance internal combustion engines of the type operated by atomized fuel, such as gasoline atomized by air, and more particularly to an improved head for high performance internal combustion engine.

INCORPORATED BY REFERENCE

An article entitled "Ford, Mercury, Lincoln Big V-8" from Petersen's Complete Book of Engines, pages 64-67 and pages 219, 225, 236 and 237 of the Book entitled Automotive Engine Design by William H. Crouse are incorporated by reference as background prior art.

BACKGROUND

The present invention relates to an improved head to be used on a standard 429 or 460 Ford block, as shown in the above-identified article, to convert this standard block into a competitive racing engine and it will be described with particular reference to this use; however, the head has general application and can be used to convert various existing blocks into high performance internal combustion engines for use in competition or other high performance situations, such as large trucks.

There is a substantial demand for high performance heads to convert existing standard blocks into competitive or high horsepower engines; however, these heads have generally involved hand-made structures with porting plates and auxiliary machined components which are so expensive that lowbudget racing teams or racing enthusiasts can not afford such heads. Such people do not have the resources and machinery for producing such competitive heads. In addition, there is a great demand for a head that can be mass produced for converting existing gasoline using blocks into high horsepower engines to compete with diesel engines in generators and large trucks. Consequently, there is a substantial need for a high production head which can be cast and sold, with appropriate machining for valves, valve seats, etc., which head will be as competitive as specially produced heads, but without requiring the expense and facilities heretofore needed in producing custom heads. Such a high production head has not been heretofore possible because the existing techniques in head designs were such that they could not be incorporated into the limited space available in a mass produced head for use on a standard engine block. Increasing intake and exhaust valve sizes and porting within the constraints of a standard mass produced head resulted in substantial eddy current disruption of flow to and from the combustion chamber within the head, whether the head was a hemi or wedge. These eddy current flow areas caused some precipitation of atomized fuel from the entraining air on intake, and caused substantial back pressure during the exhaust cycle of the internal combustion engine. Further, to increase the compression of the head, a necessity for competitive heads and some high production heads, the valves often were closely adjacent the cylinder walls to cause a shrouding effect so that there were uneven flow around the valves as they were opened for intake or exhaust. Attempts to crowd high flow passages into a limited amount of available metal of a cast head, cause uneven flow around the heads, areas of low velocity to allow fuel separation and limited volumetric capacity on both intake amd exhaust. Thus, the gases limited the effect of having the valves operate rapidly (over 5000 RPM) and with high lift cams. All of these limitations prevented efforts to produce a standard, high production competitive internal combustion engine head of the wedge-type for use with the many cast engine blocks now existing, especially for 460 Ford, 385 series engines.

THE INVENTION

The present invention relates to an improvement in a cast head for a high performance internal combustion engine of the type using an atomized mixture of air and liquid, which improved head overcomes all the difficulties and limitations as discussed above and as found in previous attempts to produce a cast, high production head for high performance use of standard engine blocks.

In accordance with the present invention, the improvement is used in a head having wedge type combustion chambers, each chamber of which extends upwardly from a head mounting surface at a flat quenching surface on the mounting surface. This quenching surface at the low end of each wedge chamber extends generally along a chord of a cylindrical piston defined area on the head. Such heads have a concave, contoured wedge-shaped cavity forming surface, which formed cavity tapers outwardly from the quenching surface between a shallow innermost part, or area, and a deeper, outermost part, or area. Each combustion chamber of the head includes a circular exhaust valve seat defining an exhaust outlet at the deeper end of the combusion chamber and having a first axis, a circular intake valve seat defining an intake inlet at the deeper end of the combustion chamber and having a second axis, an exhaust port passage extending from the exhaust outlet with a first passage portion extending generally axially of the first axis and a second elongated outlet passage portion with a general axial centerline forming a first angle with the first axis, and an intake passage extending to the intake inlet with a first passage portion extending generally axially of the second axis and a second elongated inlet passage portion with a general axial centerline forming a second angle with the second axis for introducing an atomized mixture of air and fuel into the combustion chamber through the intake inlet. By using the present improvement, a standard internal combustion engine block can develop, at 5000 RPM a brake specific fuel consumption of substantially below 0.50 lbs/Bhp-Hr and a brake horsepower of over 400 Hp. These operating characteristics show high efficiency at both high torque and high horsepower.

The improvement in the present invention includes providing the cavity forming surface in the location between the exhaust seat and the quenching surface with a generally convex shape to increase the velocity of the gases flowing into the exhaust outlet at the location during the exhaust cycle of the engine. In this manner, high velocity flow is created as gases are forced from the cylinder through the opened exhaust valve so that flow occurs around the valve in a direction generally parallel to the valve stem. In accordance with this improvement, together with a general conical shape for the wall of the combusion chamber around the exhaust port, the combustion chamber acts as a funnel forcing gases axially through the exhaust outlet into the exhaust passage at a high velocity created by the funneling action. This action is due to the improved shape of the combustion chamber adjacent the exhaust valve. A mass of metal is built up to create a gradually sloping, generally vertical exhaust flow. This goes against general principles of avoiding shrouding of the intake and exhaust valves.

In accordance with another aspect of the present invention, the intake passage, which communicate with the improved combustion chamber, includes a velocity increasing restriction adjacent to or near the intake gas inlet. This restriction increases the velocity of the incoming atomized fuel so that it is directed in an even fashion around the total intake valve head, as the valve head is opened during the intake cycle of the engine. By this novel combination of structures, the velocity of the incoming air is increased without decreasing the volume of the air so that the atomized fuel is retained in suspension. The novel shape of the combustion chamber at the intake port or intake inlet also allows even flow in an axial direction around the poppet valve head to prevent abrupt changes in direction as atomized fuel is directed into the combustion chamber during the intake cycle of the engine. These improvements in the shape of the wedge type combustion chamber, especially in the exhaust area, and the intake gas passage allows a substantially improved efficiency and unexpectedly high horsepower increase when using this head, in a mass production form, on a standard internal combustion engine block. Mass production form is an as cast head with normal machining and cleaning, without custom polishing and porting. This unique wedge type combustion chamber shape, the increased velocity and air distributing concepts in the chamber adjacent the exhaust outlet and the increased velocity concepts in the intake passage are all three combined with unique porting angles to produce a highly competitive, yet mass producible head for use with standard blocks. This has never been accomplished at acceptable costs or otherwise.

This particular improvement relates to a fuel burning engine of the type using atomized fuel, such as gasoline, which, for better performance, requires a flat quenching surface associated with the wedge combustion chamber. A wedge combustion chamber also allows an in-line valve train which is highly beneficial in competitive applications. In accordance with the improvement of a wedge head mentioned above, there is a 3% restriction in the intake passage adjacent the intake valve so that the velocity of the incoming atomized air increases to maintain the fuel in suspension without decreasing the volume of incoming fuel. Abrupt changes which result in zero velocity are also eliminated in the flow network coming into or exhausting from each of the several combustion chambers. In this manner, a high intake flow, such as 380 cfm at 25 inches of water, is possible on this head when used with a standard block. In accordance with another aspect of the invention, the intake passage has a high angle and includes a bowl area below the intake valve to distribute flow of intake gas around the total circumference of the intake valve. This even distribution of gas, together with the increased velocity at the valve area, maintains rapid incoming flow. The combustion chamber is contoured so that as the incoming flow around the intake valve is distributed within the combustion chamber, there are no abrupt changes in angles which would tend to remove fuel from its atomized state and cause uneven burning.

By using the present invention, the wedge type combustion chamber is relatively small in area, i.e. about 72 cc for a 4.37 bore engine. The combustion chamber is contoured in a fashion similar to squat type conical surfaces generated about first the intake valve and then the exhaust valve. A flat top piston, which provides better flame travel, can be used with this head and still produce compression in the neighborhood of 12:1. In the past, a flat top piston could not be used if high compression was desired. By contouring the wedge combustion chamber to get the desired flow both during exhaust and intake, compression is increased only slightly by milling off the deck. Such deck milling, is to be minimized because it changes the contour of the novel combustion chamber and reduces the even flow characteristics obtainable by using the present invention. For that reason, increase in compression in the uniquely shaped combustion chamber is obtained by moving the valve seats inwardly so that the valves occupy more volume in the relatively small combustion chamber and, thus, reduce the volume of the combustion chamber.

By using the present invention, the exhaust flow is in the general range of 300 cfm at 25 inches of water with a bore of 4.36 inches. This combined with the previously mentioned intake flow of 380 cfm produces a highly efficient, high performance, free breathing competitive head.

In accordance with the present invention, there is greater flow through the valves when they are partially opened than in prior mass produced heads. This advantage is accomplished in a head using the present invention because the flow in the exhaust cycle and in the intake cycle is in a direction generally axial of the valve stem and is evenly distributed around the head of the two valves. This improved flow concept for intake and exhaust flow greatly increases the breathing capacity of the head without requiring a tremendous amount of space, not available for normal conversion of standard blocks into high performance engines.

The present invention is useful for an engine of the type designed to operate over 5000 RPM and where it is necessary to maintain incoming gasoline atomized, even with larger air volume as experienced when using the present invention.

By using the present invention, as so far described and as described in more detail in this specification, it is possible to produce a wedge type head having high intake and exhaust flow volumes, together with an even distribution of flow in the combustion chamber, so as to create a brake specific fuel consumption of below 0.5 at 5000 RPM. At this operating condition, the brake horsepower is still over 400 BHp.

In accordance with the invention, the wedge combustion chambers are formed generally by two wide intersection low profile or squat cones so that the chordal quenching surface has a portion extending into the area between the valve openings and a mass of material is provided in this area to form gradual, generally vertical downward slopes toward the valve openings.

The primary object of the present invention is the provision of an improved cast head for high performance internal combustion engines of the type using an atomized mixture of air and liquid fuel, which cast head can be mass produced and still create high horsepower and high flow rates within the constraints imposed by standard production blocks.

In accordance with another object of the present invention there is provided an improved cast head for an high performance internal combustion engine, as defined above, which head produces generally straight in, evenly distributed air flow through the intake valve during the intake cycle and a funnel type exhaust flow during the exhaust cycle.

Still another object of the present invention is the provision of an improved head, as defined above, which head can be mass produced and needs no professional machining to obtain high performance characteristics on a standard production block.

Still a further object of the present invention is the provision of an improved cast head which retains the quenching surface without hindering free flow to and from the combustion chamber through appropriate valves.

Still another object of the present invention is the provision of an improved cast head for use on standard engine blocks, which head has wedge-shaped combustion chambers and a velocity increasing protuberance in the combustion chamber at the lower portion or area of the chamber, which protuberance causes high velocity flow to the exhaust port during the exhaust cycle of the internal combustion engine.

Another object of the present invention is the provision of an improved head to be used with a standard, high capacity engine block and having sufficient flow characteristics that there is substantial flow through the valves for approximately 300° of cam rotation with a lift in the neighborhood of 0.750 to 0.800 inches.

Still a further object of the present invention is the provision of an improved head, as mentioned above, which head operates at a low brake specific fuel consumption at approximately 5000 RPM and capable of maintaining atomized liquid fuel in large volumes of incoming combustion mixture during an engine intake cycle.

These and other objects and advantages will become apparent from the following description taken together with the drawings which are set forth in the next section.

BRIEF DESCRIPTION OF DRAWINGS

The present invention relates to a unique configuration of a wedge type head for use on a standard engine block to convert the standard block into a competitive engine and it will be described with the accompanying drawings. These drawings show the preferred embodiment of the invention and illustrate the inventive concepts of the invention when they relate to unique contours, angles and metal build up.

FIG. 14 is a cross-sectional view taken generally along line 14—14 of FIG. 13 showing the intake passage of the present invention;

FIG. 15 is a side view taken generally along line 15—15 of FIG. 13;

FIG. 16 is a schematic left side view showing the inlet port generally used in the present invention together with a constructed inlet port of a standard head of the type previously used for an engine on which the present invention is used;

FIG. 17 is a schematic end construction view showing the intake port of the present invention compared with a somewhat standard intake port and showing a flow restriction added to the inlet passage for the purposes of increasing intake flow velocity;

FIG. 22 is an end view similar to FIG. 21 showing the intake valve in the open position and illustrating the novel surface contours of the combustion chamber at the intake valve;

FIG. 23 is a schematic end construction view showing the contour of the combustion chamber adjacent to the exhaust opening;

FIG. 24 is a end view, similar to FIG. 23, showing the cross-section at the intake opening of the preferred embodiment of the present invention;

FIG. 25 is a pictorial construction view showing flow of gases through the exhaust valve port during the exhaust cycle of the engine as the piston is driven upward;

FIG. 26 is a pictorial view similar to FIG. 25 showing the intake gas flow through the intake valve of the preferred embodiment of the present invention as a vacuum is created by the piston moving downward;

DETAILED DESCRIPTION OF PREFERRED EMBODIMENT

Figure 1:
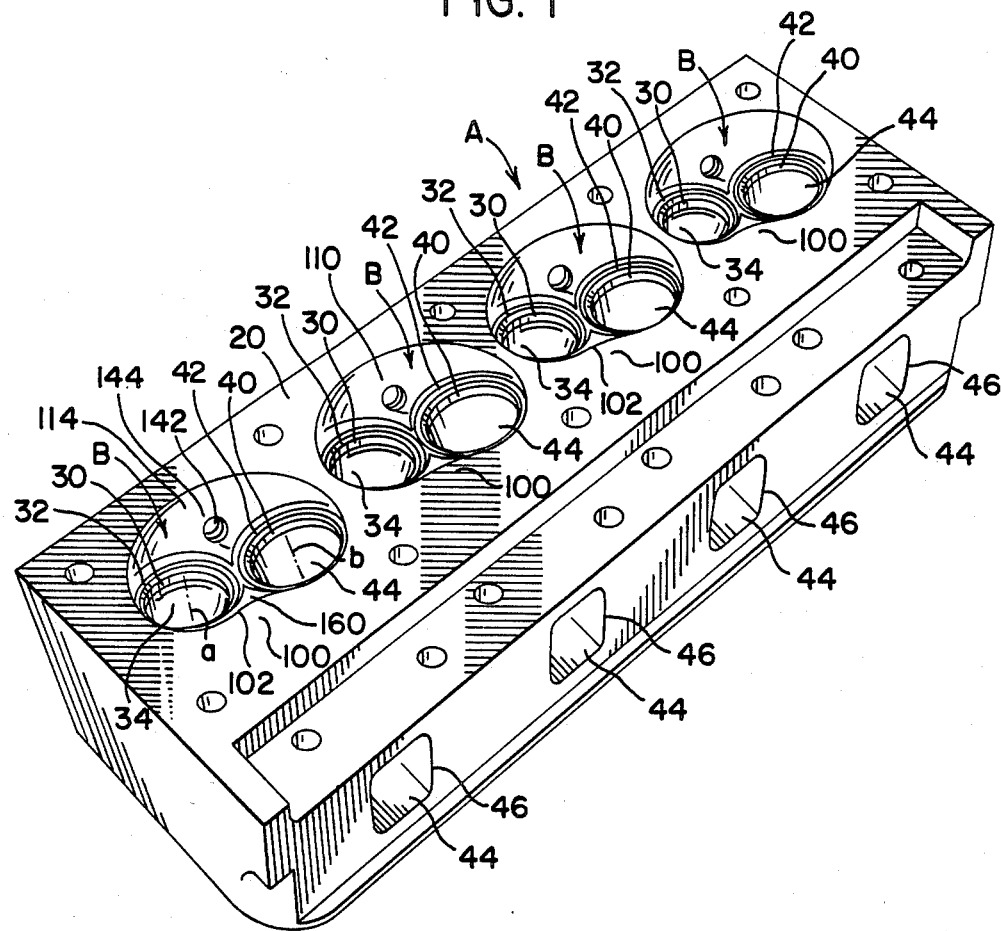
FIG. 1 is a bottom pictorial view of a head constructed in accordance with the present invention.

Referring now to the drawings wherein the showings are for the purpose of illustrating the present invention, these drawings show head A constructed in accordance with the invention. The shape of the wedge combustion chamber B for each cylinder, defined by a circle C, forms an aspect of the invention and is used to obtain the improved characteristics set forth above. The novel shape of the combustion chamber can be best illustrated by the drawings taken in combination and the drawings are detailed for the purpose of illustrating this novel shape. The present invention is directed to head A specifically designed for the Ford 460 V8 engine in the 385 series; consequently, four separate cylinders with reciprocating pistons F are covered or closed by head A. One of these cylinders is shown as circular opening 12 in head gasket 10, best seen in FIGS. 2, 5 and 6. Opening 12 corresponds with circle C that defines the cylinder wall of a cylinder D in a high performance standard block E, as shown in FIG. 3. Since the engine is a V8, two banks of cylinders D are a part of block E and a set of heads A are used. Each head is substantially the same and only one will be described. The upper face, or deck surface 20 of illustrated head A is bolted against the upper face on one side of block E to form combustion chambers for reciprocating pistons F.

Each of the combustion chambers B, constructed in accordance with the present invention, will be described separately and this description will apply to all of the combustion chambers of head A as well as the head on the opposite side of block E. The associated valve train and other structural characteristics forming the mechanism to allow intake and exhaust of gases during operation of piston F will be described with respect to a single combustion chamber. This description will also apply equally to the remaining combustion chambers B.

Figure 9:
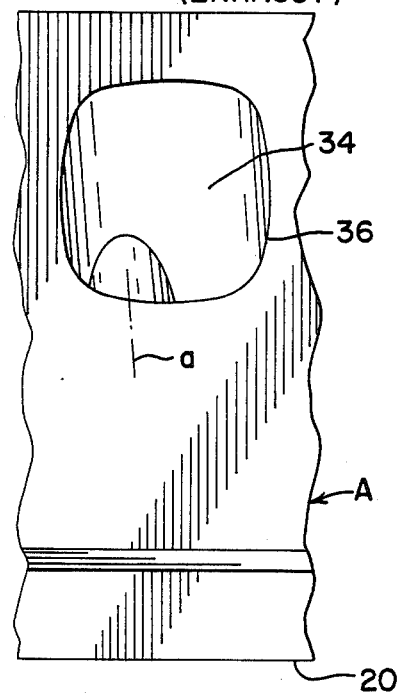
FIG. 9 is a right side view of the exhaust port and exhaust passage looking toward the valve, as shown in FIG. 8.
Figure 11:
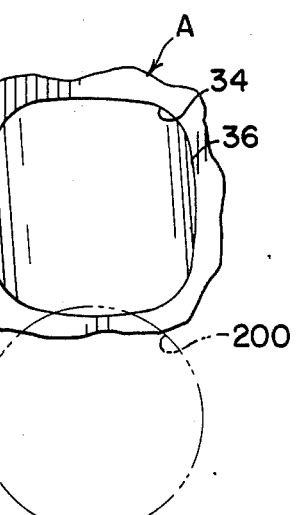
FIG. 11 is a side elevational view taken generally along the right hand side of FIG. 10, showing the exhaust port together with an outline of the exhaust port in a normal production head.
Figure 21:
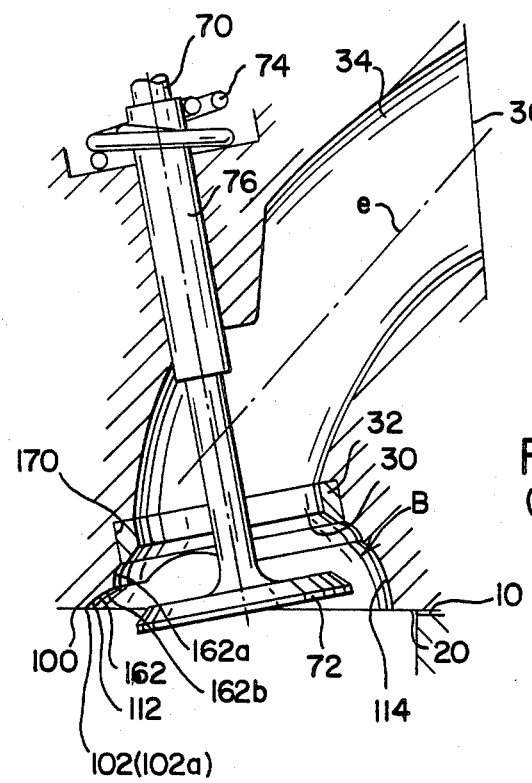
FIG. 21 is a schematic end construction view showing the exhaust valve in the present invention of the open position illustrating the novel combustion chamber shapes.

An exhaust opening 30 is defined by a circular valve seat insert or ring 32 which is cryogenically mounted in the aluminum head and includes a frusto-conical surface forming the actual valve seat of the exhaust port for combustion chamber B. Exhaust passage 34 extends from ring 32 to an exhaust port 36, as best shown for its shape in FIGS. 7, 9 and 21. With respect to the intake system, intake opening or inlet 40 is defined by a circular ring or valve seat insert 42 having a frusto-conical surface defining the actual valve seat against which the intake valve operates. Intake passage 44 is contoured to allow high velocity flow of atomized fuel and communicates opening 40 with external port 46, four of which are shown in FIG. 1 and are better seen in FIGS. 15 and 22. The shape of the intake passage has the characteristics to allow high velocity flow into the combustion chamber.

Figure 3:
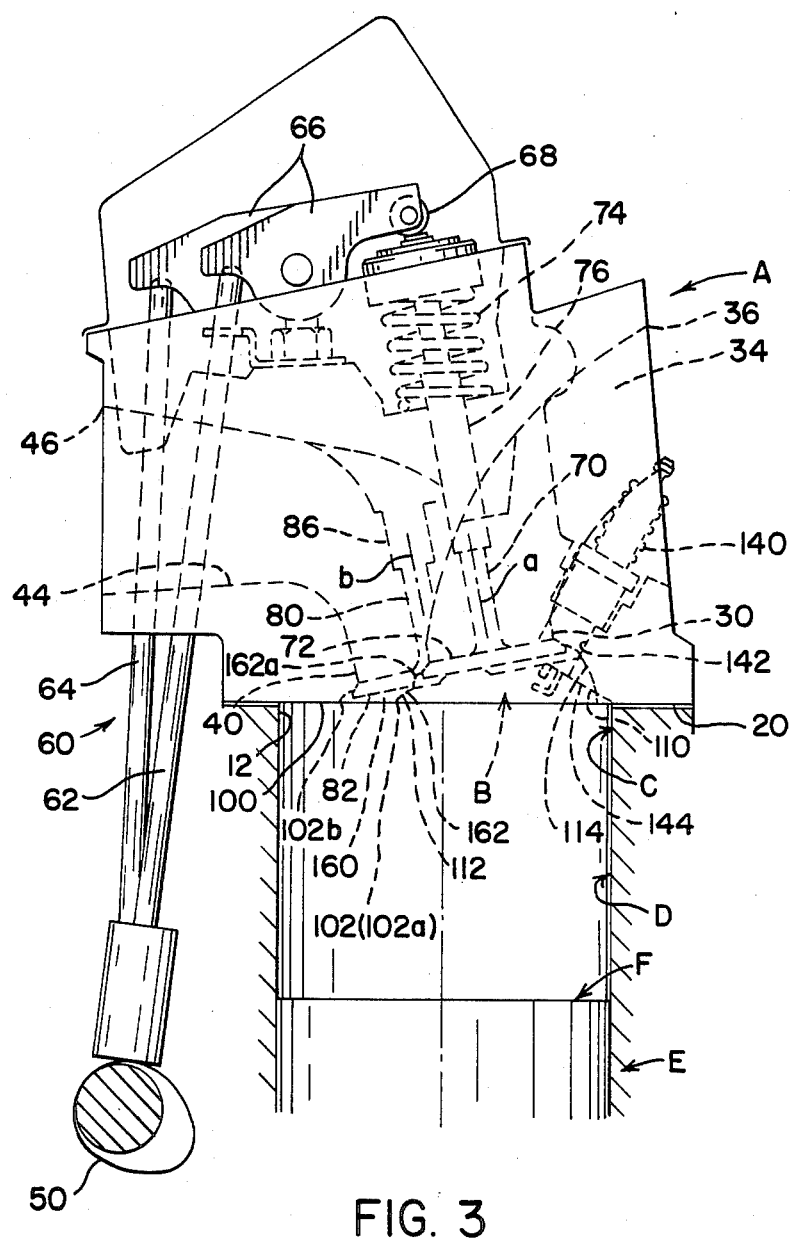
FIG. 3 is an end elevational view showing the valve train at the exhaust valve of the head shown in FIG. 1.
Figure 4:
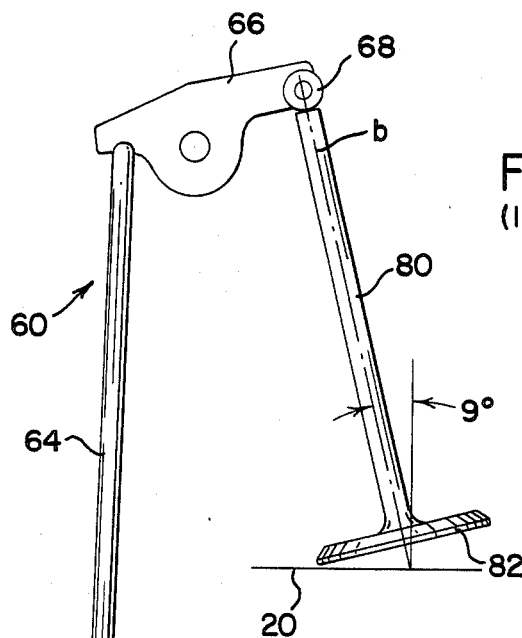
FIG. 4 is a schematic view showing the valve train employed in a 460 Ford engine which will use the present invention.
Figure 7:
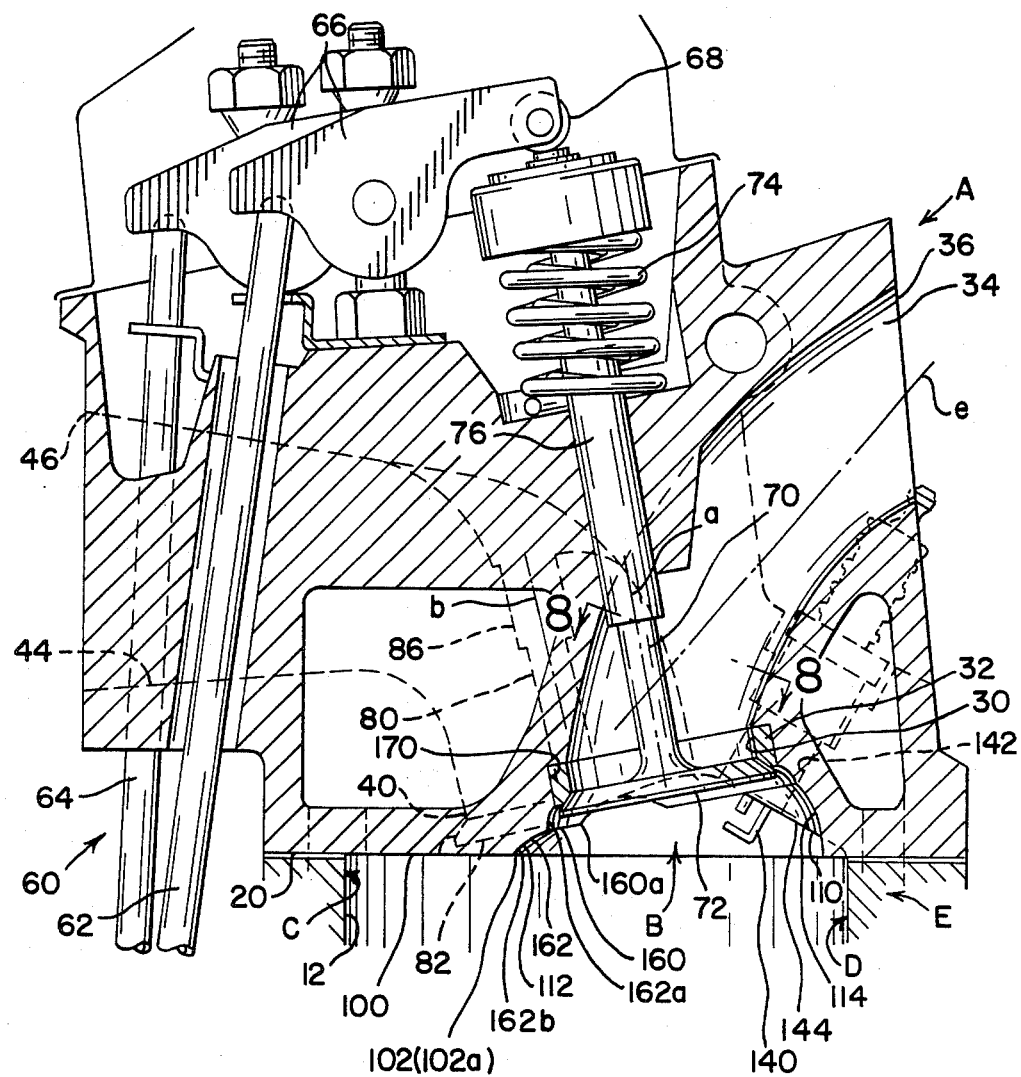
FIG. 7 is an end sectional view taken generally along line 7—7 of FIG. 6.
Figure 8:
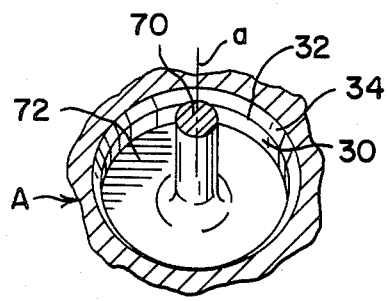
FIG. 8 is a pictorial view illustrating the top side of the exhaust valve as viewed from the exhaust passage taken along line 8—8 of FIG. 7.
Figure 13:
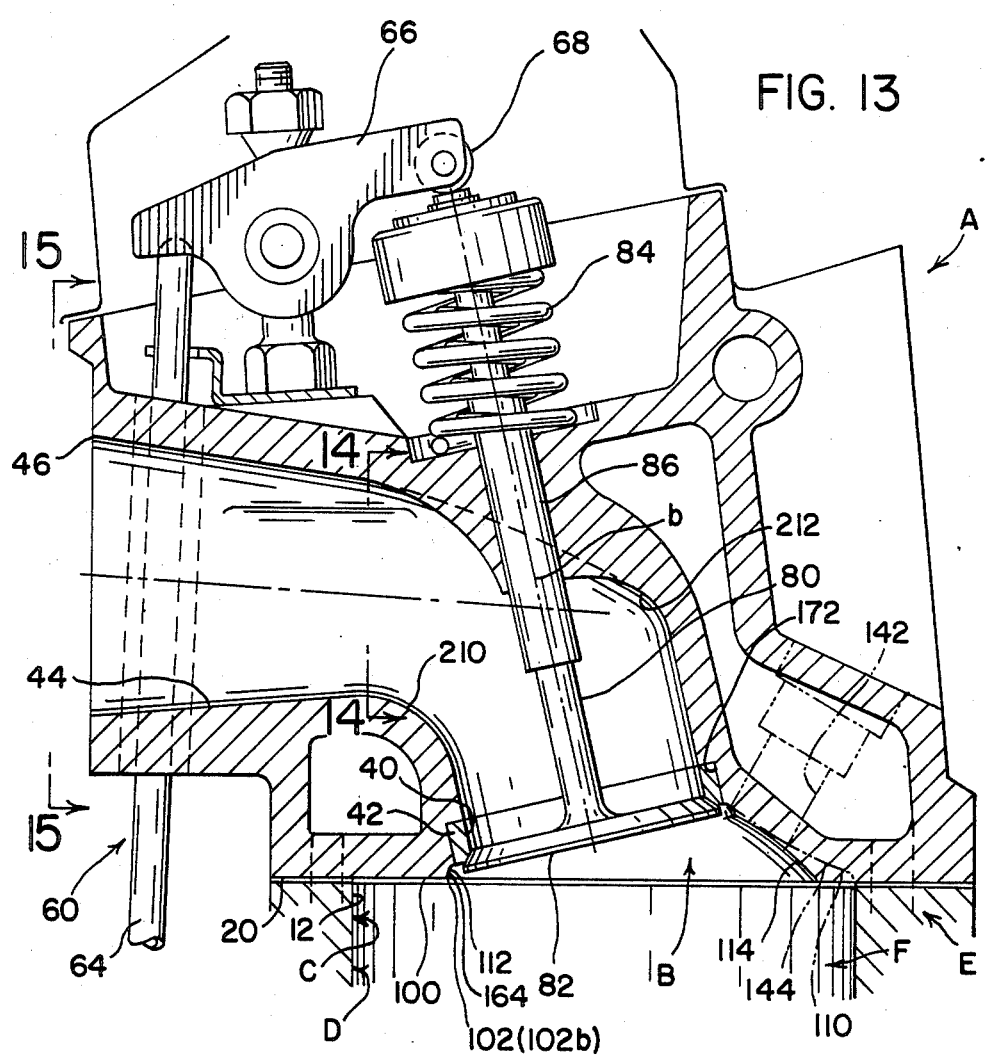
FIG. 13 is is cross-sectional view taken generally along line 13—13 of FIG. 6.

Referring now to FIGS. 3 and 4, a cam shaft 50 is used to open and close the exhaust and intake valves in unison in accordance with standard engine technology. Valve train 60, best shown in FIG. 3, includes a series of push rods 62 for the exhaust valves and a series of push rods 64 for the intake valves. A commercial, high performance rocker arm 66 is provided with a roller 68 for pushing downwardly upon either exhaust valve 70 or intake valve 80. Rod 62 operates valve 70, which is a poppet valve with a valve head 72 for opening and closing the port or opening 30 each defining the exhaust opening for a combustion chamber B. Each rod 62 operates against spring or springs 74 and the valve 70 reciprocates in an appropriate cylindrical journal sleeve or guide 76. Each of eight intake valves 80 is operated in the same manner by a push rod 64. Valve 80 is a poppet valve with a circular head 82 adapted to open and close intake port 40 defined by insert or ring 42 and operates against the bias of spring 84. Guide 86 reciprocally mounts valve 80 in accordance with standard valve train technology. Axes a and b are the axes of reciprocation for the valves 70, 80, respectively. In accordance with the present invention, they are each canted outwardly from each other from a vertical direction by an amount of approximately 5°. They are also pivoted or leaned as shown in FIGS. 7 and 13 at angles of 9° and 13°, respectively. The outward spread of 5° together with the lean of less than about 15° allows the wedge shaped combustion chamber B to be very shallow to increase the compression ratio while maintaining unique gas flow characteristics of combustion chambers B. As is noted, by using the wedge type combustion chamber, both valves lean the same direction and are operated by a cam rotated in the lower portion of the engine. This is a standard, but higher beneficial valving arrangement for high performance engines. Using a "wedge" combustion chamber allows for a flat burn control surface, known as a "quench" surface 100 which extends across a chord x, generally parallel to line c between axes a and b as shown in the detailed layout drawing of FIG. 5. This quench surface is extremely beneficial when an engine is operating on atomized liquid fuel, such as gasoline. In accordance with standard practice, quench surface 100 has a generally straight edge as shown by line or chord x in FIG. 5; however, in accordance with an aspect of the present invention, the edge 102 of quench surface 100 has a unique, novel curved shape, which shape includes two arcuate concave portions 102a, 102b generally concentric with axes a and b of valves 70, 80, respectively, and an intermediate convex portion 102c. This convex portion is novel and protrudes inwardly in a direction between the two axes a and b to form an undulating quench surface. The specific shape of this undulation; combined with the contour of the cast metal in chamber B, produces a controlled flow of gas in the space between the quench surface and valves 70, 80 during either intake or exhaust of the cylinder in the block. One highly important aspect of the invention is the generally vertical contour of chamber B in this particular area adjacent edge 102 of quench surface 100. This contouring is evident from the drawings; however, it will be described in detail later.

Figure 2:
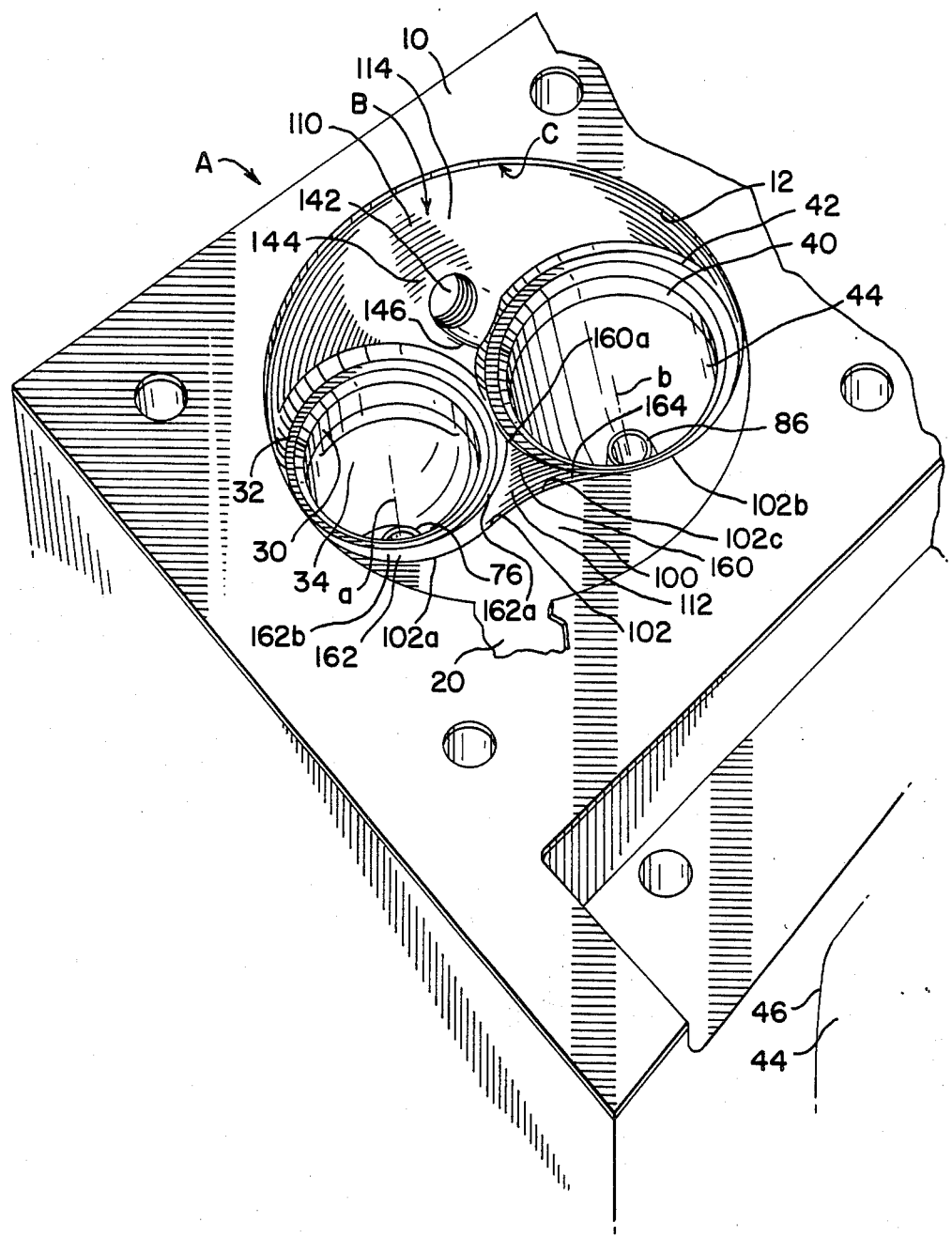
FIG. 2 is an enlarged partial view of the head shown in FIG. 1 with a head gasket in place to illustrate the position of the cylinder in the joined block with respect to each of several combustion chambers of the head shown in FIG. 1.
Figure 20:
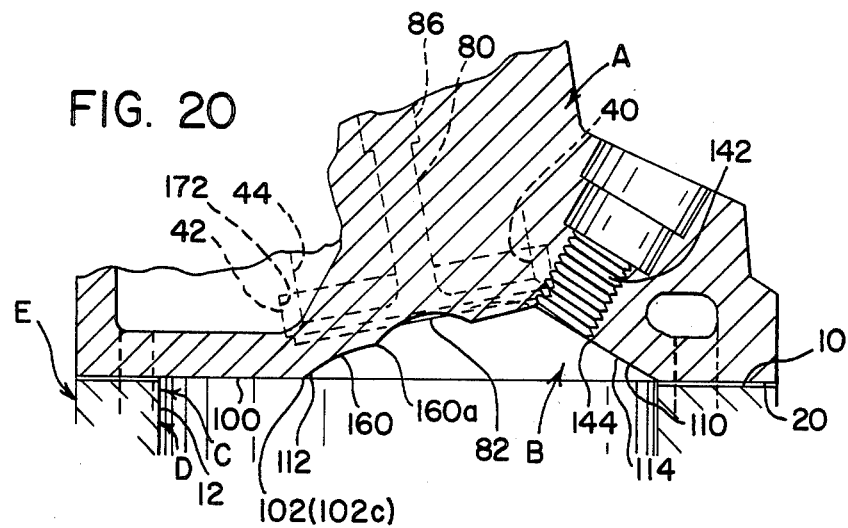
FIG. 20 is a partial cross-sectional view of the combustion chamber at the spark plug mounting area taken along line 20—20 of FIG. 6.
Figure 27:
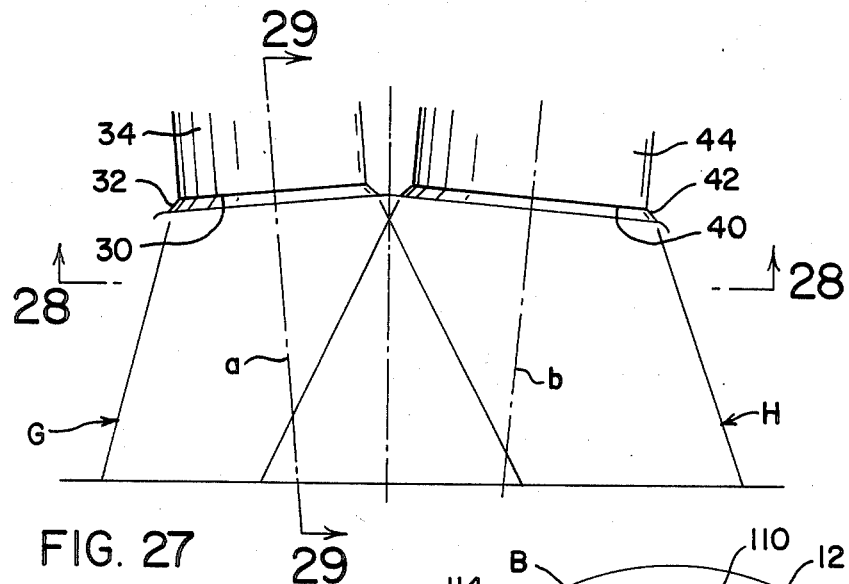
FIG. 27 is a geometric construction view showing the general configuration of the combustion chamber contoured in accordance with the present invention wherein two intersecting, imaginary, low profile or squat cones define the combustion chamber surface.
Figure 28:
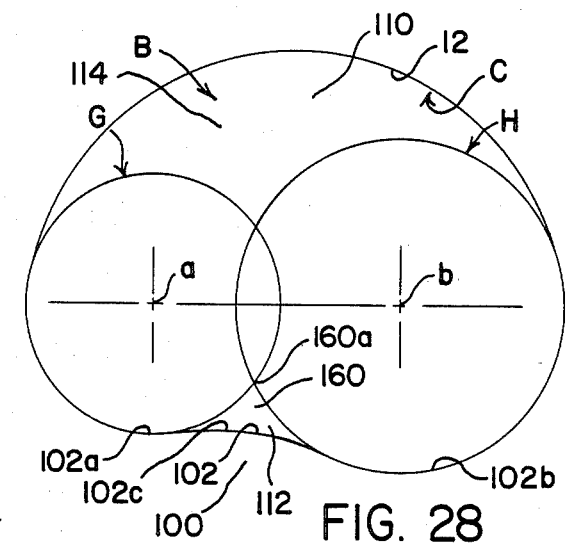
FIG. 28 is a geometric construction view generally from the bottom taken along line 28—28 of FIG. 27 with the contoured intermediate cavity surface of the combustion chamber being added.
Figure 29:
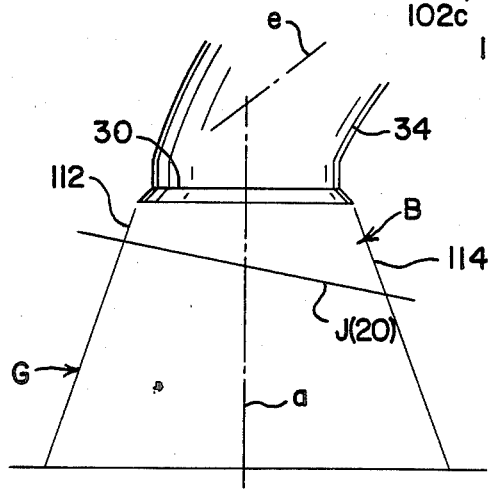
FIG. 29 is a side geometric construction view showing the truncation of the two construction cones taken along line 29—29 of FIG. 27 to define the wedge-shape combustion chamber B of the present invention; and, FIG. 30 is a graph illustrating the brake specific fuel consumption of an engine using a head constructed in accordance with the present invention and a standard head for a high performance engine to which the present invention is directed.

Referring now to FIGS. 27, 28 and 29, the general concept employed to generate the contoured surface of combustion chamber B as shown in FIG. 2 is schematically illustrated. Two generally flat, squat cones G, H are provided in a position generally concentric with axes a, b, respectively. As shown in FIG. 28, the surfaces of these intersecting cones G, H are joined by a gradually contoured intermediate surface 110 which surface is also shown in FIG. 20. In the orientation shown, the gradual contouring of surface 110 extends around the upper portions of cones G, H. These two surface (a hyphen) joined, intersecting cones G, H are intersected by an angled plane J shown in FIG. 29 as a solid line. The angle of line J with respect to axis a defines the wedge which, in accordance with the present invention, is less than about 15° and is made possible by the small lean of valves 70, 80. By constructing the surface of combustion chamber B in accordance with the general procedure heretofore described i.e. using two cones concentric with the axes of the valves, both intake to and exhaust from chamber B are controlled as flow patterns somewhat parallel to axes a and b at the openings 30, 40. This flow control causes an increased gas velocity and straight, parallel flow through the opening at chamber B, especially at opening 30 during exhaust. The cast or machined surface adjacent edge portion 102a is generally vertical and slopes downward into the exhaust opening 30. This slope produces generally straight, uniformly distributed flow through exhauast opening 30 into exhaust passage 34 and then through port 36.

To ignite the atomized fuel contained in the incoming air, it is necessary to employ a spark plug 140 mounted in bore 142 having an opening in a surface 144. Surface 144 and opening 142 are constructed so that there is no indentation to hinder smooth exhaust flow from combustion chamber B during the exhaust cycle of piston F. A gradual ledge 146 shown in FIG. 2 from port 142 toward intake opening 40 is generated in surface 110 to maintain the conical or funnel configuration of chamber B in a direction toward exhaust opening 30, while, in turn, causing a relief at the right side for the incoming air through opening 40.

Port or opening 142 is directed toward the exhaust opening 30 to prevent turbulence during the intake of air. Gas flow in the area of the spark plug 140 is shown in FIGS. 25 and 26.

Figure 18:
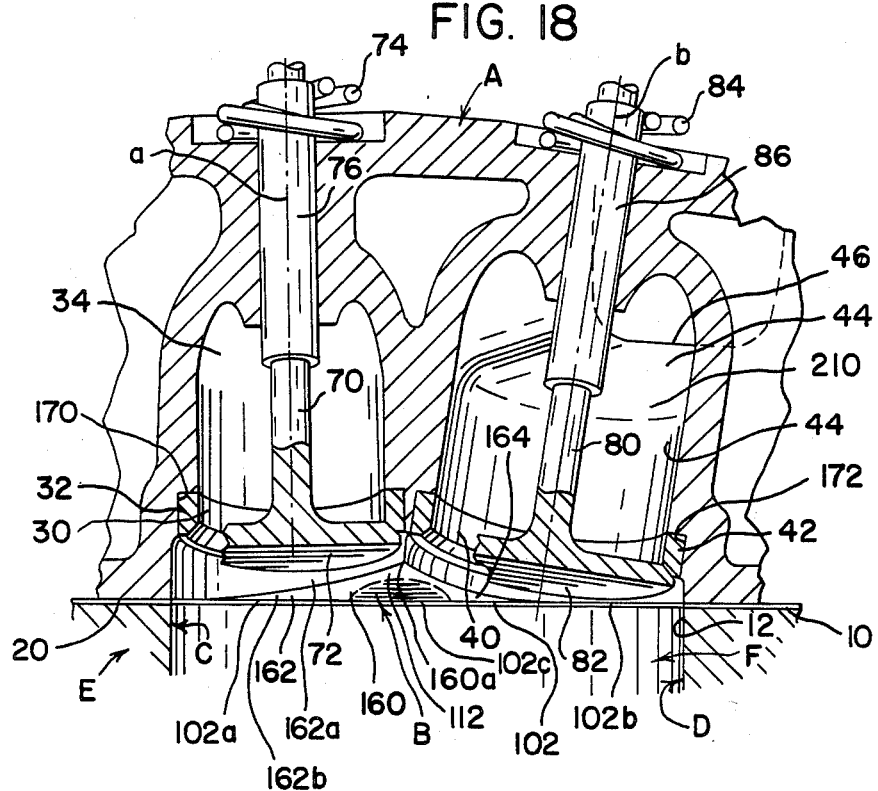
FIG. 18 is a partial cross-sectional view taken generally along line 18—18 of FIG. 6.

The wedge shaped cavity forming each combustion chamber B has a unique surface configuration which has been so far described as formed generally, but not exactly, by two relatively flat cones concentric with axes a, b. The inwardly convex protrusion 102c of edge 102 defining the novel quench surface 100 protrudes in a direction between the axes a and b and defines a mass of cast metal 160 which comprises a further protrusion between openings 30, 40 and terminating in point 160a as seen in FIG. 2. This increased mass is merged from point 160a and rings 32, 42 into the specific curved portion, or protrusion, 102c to maintain a relatively small distance between edge 102a and exhaust opening 30. This distance is small and is formed by a surface extending at a relatively steep angle, best shown in FIGS. 2, 18 and 20. By increasing the angle of the protrusion or ledge of cast metal 160 at the lower end 112 of the wedge shaped combustion chamber B, an increased velocity is created during exhaust of gases. This high velocity overcomes any shrouding effect which would be considered a disadvantage of having this metal mass close to opening 30. By using the exhaust control, vertical slope at opening 30, the space between the exhaust opening and the quench surface 100 can be very small without shrouding. Consequently, end 112 can be shallow and a high compression can be obtained without flow disturbance limitations. Lower wedge portion 112 of chamber B is sometimes known as the quench surface area of the wedge shaped combustion chamber. The other end 114 is the valving end of the chamber and has the previously described surface 110 at its outer boundary. This is best shown in FIGS. 2 and 28 together with all of the other cross-sectional views at the various areas of the inventive, novel shape of chamber B. These cross-sectional views have been taken at various positions in surface 110 and in the other surfaces at both the enlarged or upper portion 114 and the lower portion 112. The preferred dimensions at the valve seats are shown in FIGS. 23 and 24 for a cylinder with a 4.36 inches diameter. The drawings show the configuration of a combustion chamber B constructed in accordance with the present invention. Such shapes and/or contours are better visualized by the drawings than specifically defined in words, except to the extent so far explained.

Figure 6:
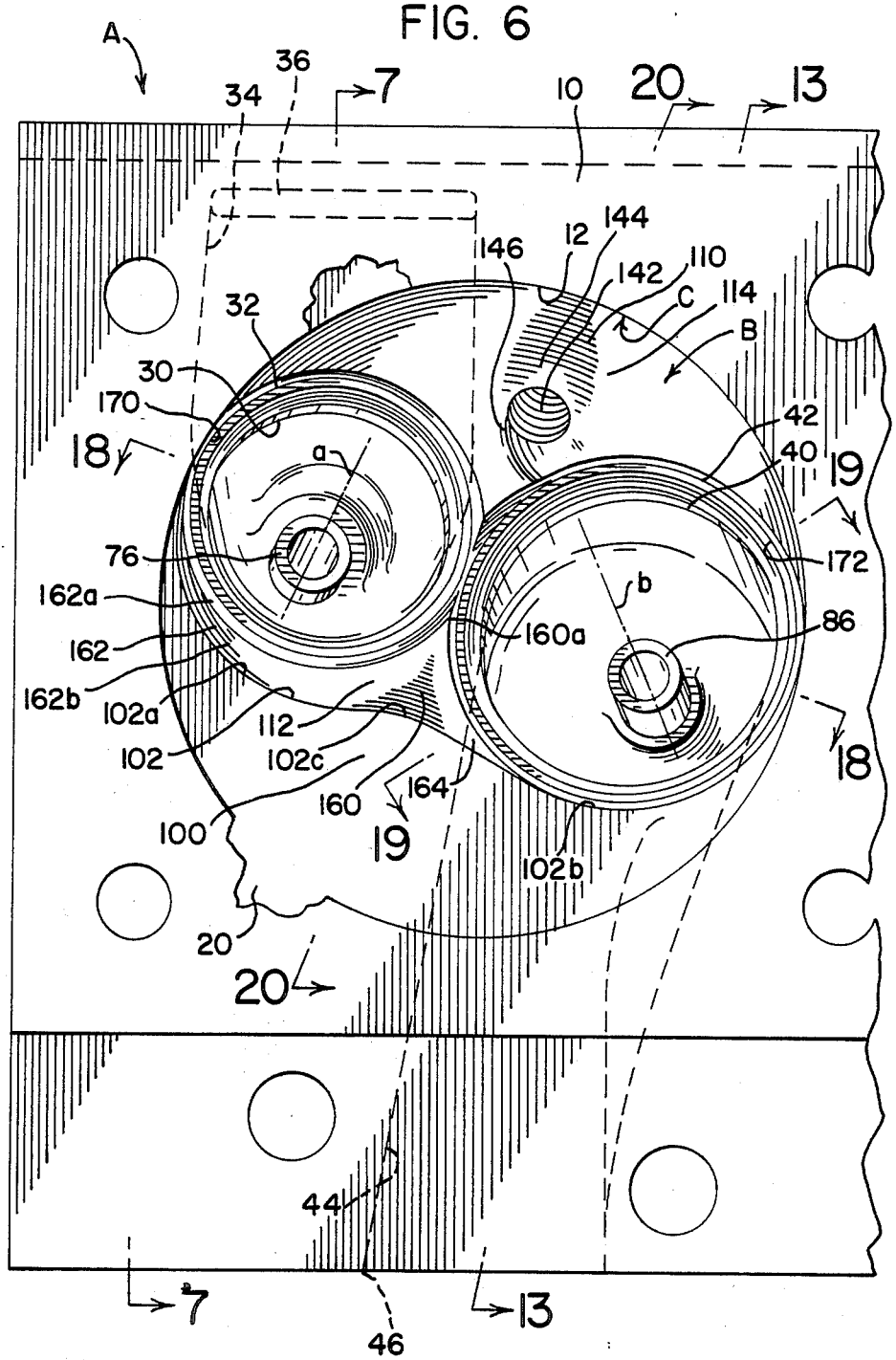
FIG. 6 is an enlarged partial, bottom view looking into the combustion chamber of the present invention.
Figure 10:
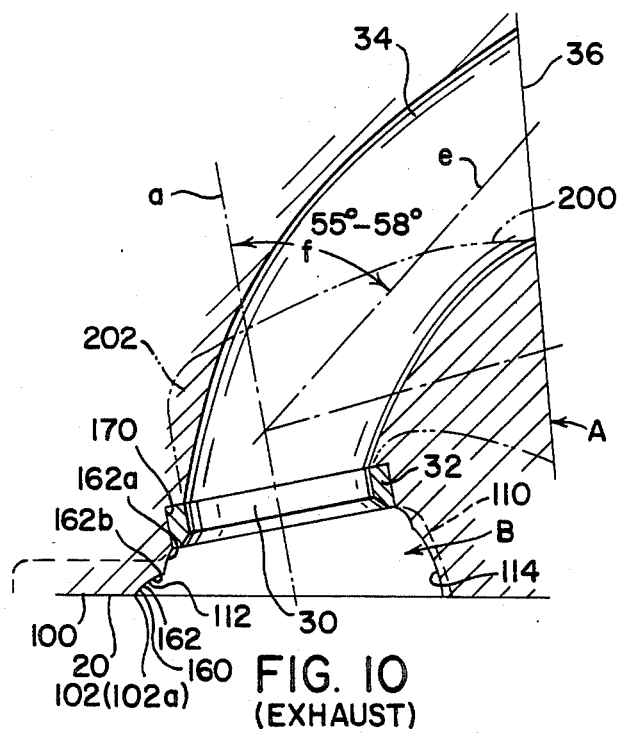
FIG. 10 is a schematic end construction view showing the novel shape of the exhaust passage of the present invention as compared with a standard exhaust passage in a production head often used on an engine to which the present invention is adapted, as well as the unique metal build-up between the quenching surface and the valve seat.
Figure 12:
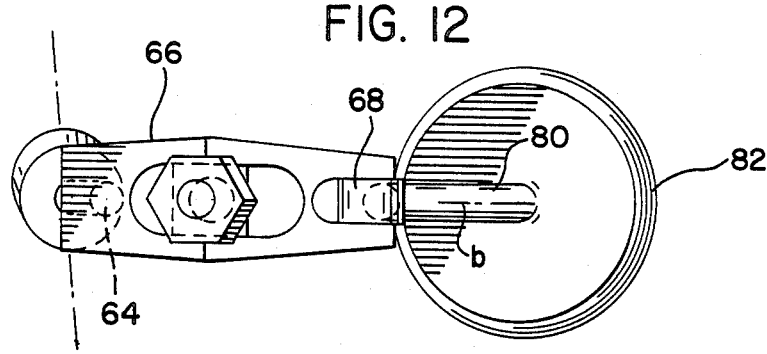
FIG. 12 is a top plan view of the valve train operating the intake valve in an engine using the present invention.
Figure 19:
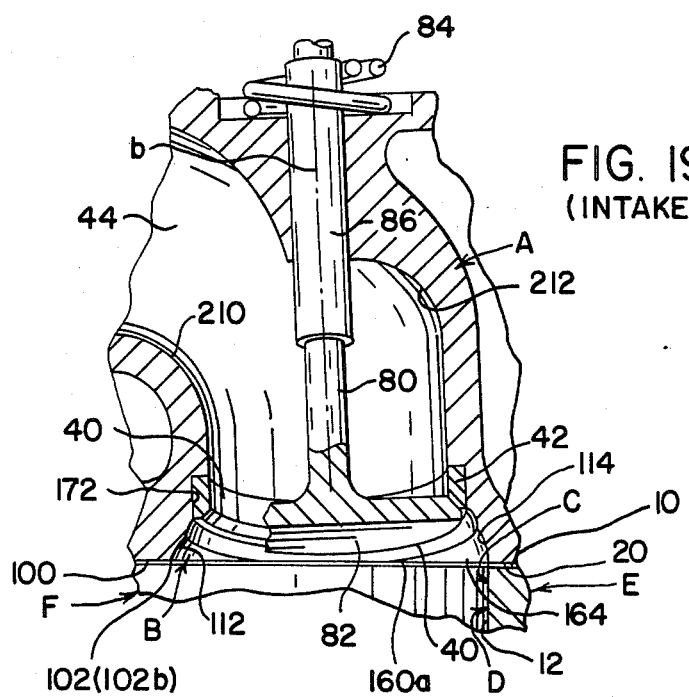
FIG. 19 is a partial cross-sectional view taken generally alone line 19—19 of FIG. 6.

The protrusion of cast metal 160 at edge portion 102a is contoured to have an exhaust valve seat portion 162, best shown in FIGS. 2, 3, 6 7, 10 and 18 and 23. Referring now to FIG. 10, mass 160 between exhaust opening 30 and edge 102a includes a first cylindrically machined portion 162a and an outer gradually contoured cast portion 162b. Cast portion 162b is the previously discussed conical wall portion for directing exhaust gases downward as a funnel in a direction parallel to axes a. Machined, cylindrical portion 162a is concentric with valve seat 32 at the surface 100 and terminates at point 160a and at a counterbore 170. The valve seat insert 32 is mounted in this counterbore. By this configuration, a flow directing funnel is formed for the exhaust gases to pass through opening 30 and into passage 34, as shown in FIGS. 7 and 10. The mass of metal cast or protrusion 160 includes a portion 164 of lesser magnitude. This intake side cast mass of metal is best shown in FIGS. 2, 6 and 19 as formed between edge portion 102b and point 160a. As shown in FIG. 6, counterbore 172 for insert 42 is similar to counterbore 170, except it generally intersects edge portion 102b of edge 100 and is coextensive with edge 102, except in the area of edge protrusion 102c. By forming a high velocity incoming air flow pattern, this close relationship of mass 164 with the cylinder defined by circle C around about 110° does not cause a shrouding effect during the intake cycle of the engine.

As so far described, the exhaust gases flow as is illustrated in FIG. 25. As can be seen, high velocity funneling of the gases is created at the exhaust valve 72 so the exhaust flows smoothly over opening 142. Flow of incoming air is also at high velocity caused by a passage restriction, which will be described later, and is schematically illustrated in FIG. 26. Incoming gas flows over the spark plug opening 142 without causing back pressure and without causing the atomized fuel to be precipitated out. The gas moves into chamber B and then around surface 110 in the direction of the illustrated arrows without any abrupt direction change.

Figure 5:
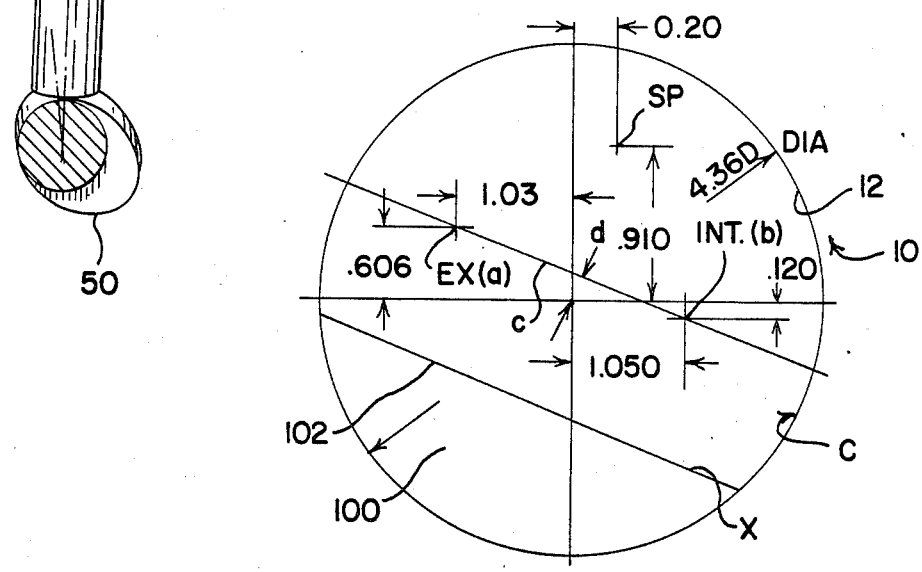
FIG. 5 is a schematic layout or construction view of the centerlines for the various components in the preferred embodiment of the invention with an outer circular dimension corresponding to the cylinder over which the combustion chamber of a head is mounted.

Referring now to FIG. 5, another aspect of the present invention is illustrated wherein line c, as discussed before, extends through axes a, b and a relatively short distance d from the center of circle C. The valves which move toward a diameter through d are positioned at the center of the circle C in cylinder D when they are fully opened. In this manner, incoming gas and exhaust gas are both communicated with the valves at the center of the cylinder in which piston F reciprocates. By making line c as close as possible to the center of circle C, the heads 72, 82 can be enlarged while still allowing center operation of the valves in the piston cylinder. Moving of the axes a, b toward center of circle C as much as possible enhances the total operation of the head A in high performance situations.

In accordance with another aspect of the invention, exhaust passage 34 has a particular configuration as in several drawings. In FIG. 10, the passage is detailed as including a general centerline e which intersects axis a of valve 70 at an included angle f. In accordance with the present invention, this first angle is in the general range of 55°–58°. This angle is steep when compared to the passage intersecting angle of the passage shown in phantom lines, which is the exhaust passage in a production head used with the standard V8 Ford 460 block. As can be seen, the standard head has an elbow type passage 200 with a large bulbous portion 202. This configuration provides a large volume below the exhaust opening for the expected result of preventing flow resistance for the outflowing of the exhaust gases. The present invention goes away from this flow concept by recognizing that high velocity flow around the exhaust valve caused by the general funneling action in combustion chamber B can give high volume flow. This flow action is enhanced by the generally gradual curve of passage 34 as also shown in FIG. 10. In this manner, it is nearly possible to see exhaust opening 30 through external port 36 at the side of head A. The transverse cross-sectional areas of passage 34 generally perpendicular to centerline e in FIG. 10 are maintained at all positions greater than the cross-sectional area of the opening 30 within valve seat insert 32. Gradual bends in passage 34, as shown in FIG. 10, improve the outflow and velocity of gases flowing from the chamber B during the exhaust cycle. This passage shape is a substantial improvement over normal heads and acts during the exhaust in a combined fashion with the novel funneling action previously mentioned.

Referring now to FIG. 17, the intake passage 44 is illustrated as having an axial centerline g at an included angle h with axis b. Included angle h is in the range of 85°–88°. The cross-sectional area of any plane generally perpendicular to the centerline g of passage 44 is greater than the opening 40 in valve seat insert 42; however, a distinct restriction portion 210, 212 is provided in passage 44. This restriction of the air with atomized fuel increases the velocity of the intake gas when passage 44 turns and moves generally parallel to axis b. The velocity increase is helpful because passage 44 must make this turn to allow the head to be within constraints of existing block designs. Instead of changing the height of head A, velocity is increased at the bend of the passages. High flow with increased velocity does not decrease the amount of incoming air, but only assures uniform air flow around head 82 of valve 80, which uniform flow is shown graphically in FIG. 26. This flow into the chamber is maintained continuous by the aforementioned contouring of surfaces forming the wedge-shaped combustion chamber B.

After creating the unique and distinctly novel combination of combustion chambers B, valves and gas passages in a dimension capable of being used by a stock block, it was found that the compression ratio was not increased effectively by removing material from deck or surface 20. Such metal removal would change the unique flow characteristics created by the unique combination of features comprising the present invention; therefore, it was found that the depth of 170, 172 could be varied slightly to change the compression ratio. This adjustment would allow piston F to come within 0.005 inches of quench surface 100, in accordance with the optimum performance characteristics of a gasoline burning engine.

One of the primary considerations in a competitive engine or a large application engine, such as used in trucks, is the ability to develop high horsepower at an acceptable RPM. The present invention when made into a mass producible head has been tested in comparison with stock heads with appropriate high performance carburetors. It was found that the present invention developed a horsepower at 5,000 RPM of 445 Hp, compared to a stock head with high performance accessories having 367 Hp at 5,000 RPM. The present invention is directed to an engine which generally operates at a speed greater than 5,000 RPM. This substantial increase of horsepower with nothing more than a different head design is a unique characteristic of the particular head disclosed in this application and distinguishes this head from other heads in horsepower increasing capabilities within the constraints of standard blocks and accessories. The compression ratio obtainable is relatively high because of the leaning of the valves 70, 80. This geometry allows a relatively shallow wedge combustion chamber.

Figure 30:
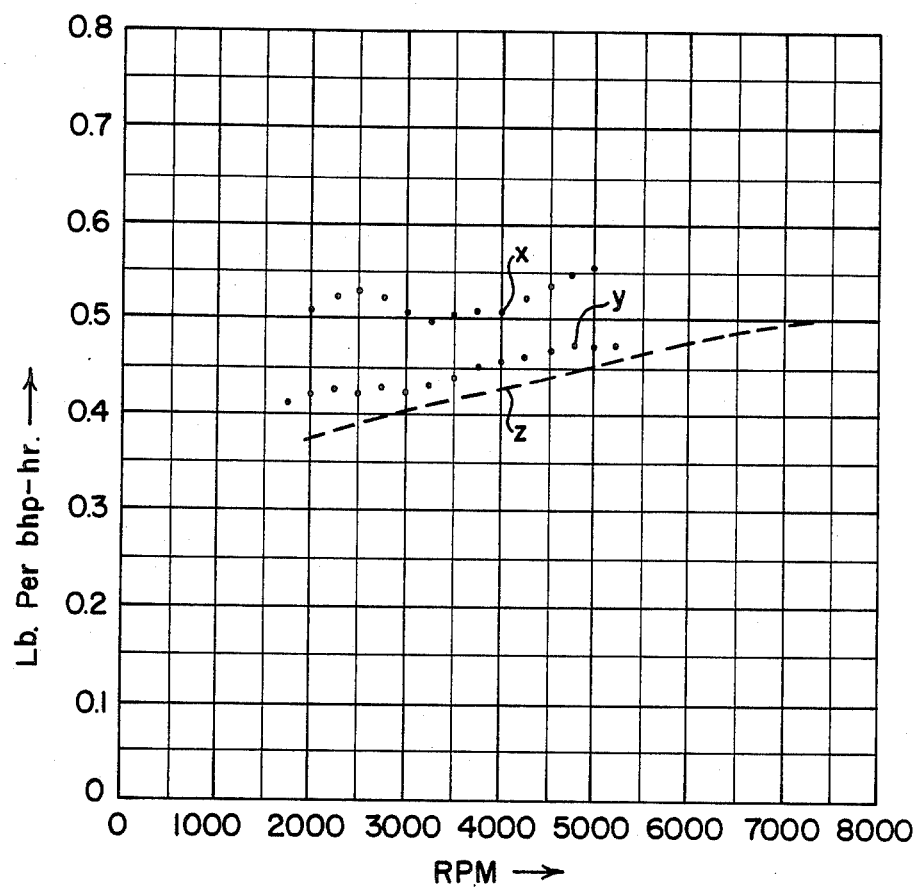

FIG. 30 shows the brake specific fuel consumption of the present invention (line z), as compared to the present invention without the build up of metal shown as mass 160 (line y) and as compared with a high performance head (line x). As can be seen, the present invention produces a brake specific fuel consumption of substantially less than 0.50 lbs/Bhp-hr at 5,000 RPM, while still developing the horsepower previously mentioned. By increasing the funneling action for the exhaust gases by the cast protrusion and mass 160, the brake specific fuel consumption has been reduced to approximately 0.37 at 5,000 RPM. This is a substantial and surprising result. This head is an improvement over all comparable competitive heads to be used on a standard block which is a 426 or 460 Ford V8 385 block whether operated in accordance with line y or z. Brake specific fuel consumption is important in competition and essential in large engine application, such as used in trucks, tanks, generators, etc. It has been found that head A increases the horsepower from a standard block by many horsepower without increasing the deck height or needing super-charging. This is a substantial advance in high performance racing engines where a minor improvement in horsepower without extreme fuel consumption is imperative and decisive from a competitive standpoint.

Head A is shown as a cast aluminum head; however, it could be cast from iron with the valve seats formed in place and inductively heated for quench hardening.

Then, the valve rim seat inserts or rings 32, 42 would not be used.

Having thus defined the invention, the following is claimed:

1. In a cast head for an high performance internal combustion engine of the type using an atomized mixture of air and liquid fuel, said head including a flat mounting surface and having, for each of several in-line circular piston areas, (a) a wedge type combustion chamber extending from a head mounting surface and defined by a flat quenching surface coplanar with said mounting surface and extending generally along a chord of said circular piston area, and a concave, contoured wedge-shaped cavity forming surface, said wedge-shaped cavity tapering outwardly from said quenching surface between a shallow chordal area adjacent said quenching surface and a deeper valving area removed from said quenching surface; (b) a circular exhaust valve seat defining an exhaust outlet at said deeper valving surface and having a first axis; (c) a circular intake valve seat defining an intake inlet at said deeper valving surface and having a second axis; (d) an exhaust passage extending from said exhaust outlet with a first passage portion extending generally axially of said first axis and a second elongated outlet passage portion with a general axial centerline forming a first angle with said first axis; (e) an intake passage extending to said intake inlet with a first passage portion extending generally axially of said second axis and a second elongated inlet passage portion with a general axial centerline forming a second angle with said second axis for introduction of an atomized mixture of air and fuel into said combustion chamber through said intake inlet; and, (f) a spark plug receiving bore in said cavity forming surface generally between said first and second axes, an improvement for obtaining, at 5000 RPM, a brake specific fuel consumption of substantially below 0.50 Lbs/BHp-Hr and a brake horsepower of over 400 Hp, said improvement comprising:

(g) said first and second axes being located adjacent a diameter defined by said circular piston area and on a line generally parallel with said chord of said quenching surface;
   (h) said valve seats being at an angle of less than about 15° from said flat quenching surface whereby said first and second axes are at an angle of less than about 15° from said quenching surface and the lower end of said intake valve seat being spaced vertically from said flat quenching surface only a slight distance;
   (i) said cavity forming surface at said deeper area having the general contour of two parallel intersecting, truncated cones generally concentric to said first and second axes with a gradually contoured surface section between said cones at the deeper valving area of said cavity forming said combustion chamber;
   (j) a velocity increasing protuberance in said combustion chamber at said shallow chordal area of said cavity, said protuberance including an edge portion, said edge portion further defined by a first and second arcuate portion generally concentric with said first and second axes, respectively, and a continuously smoothly curved intermediate edge portion inbetween said first and second edge portions extending in an inwardly concave direction into said chamber; and,
   (k) said cavity forming surface adjacent said intermediate edge portion and between the peripheral portions of said intake and exhaust valve seats which are facing one another further defined by an inwardly, generally smoothly curved convex surface adjacent said intermediate edge portion blending into an inwardly concave surface adjacent said peripherally facing portions of said intake and said exhaust valve seats to provide for an improved gas mixture and exhaust mixture flow past said seats without detrimental turbulence.

2. The improvement as defined in claim 1 wherein said exhaust outlet has a selected area and said exhaust passage has a minimum transverse section with an area greater than the selected area of said exhaust outlet.

3. The improvement as defined in claim 1 wherein said intake inlet has a selected area and said intake passage has a minimum transverse section with an area greater than the selected area of said intake inlet.

4. The improvement as defined in claim 1 wherein said intake passage includes a velocity increasing restriction adjacent said intake inlet.

5. The improvement as defined in claim 1 wherein said line of said axes is spaced from said diameter of said circular piston area a distance allowing poppet valves in said head to open at said diameter of said circular piston area.

6. The improvement as defined in claim 1 wherein said spark plug receiving bore in said gradually contoured surface section is shaped to prevent any substantial surface indentation.

7. The cylinder head of claim 1 wherein said first and second axes are canted away from one another at an angle of approximately 5°.

8. The improvement as defined in claim 1 wherein said second angle is an angle of about 85°-88°.

9. The improvement as defined in claim 8 wherein said exhaust outlet has a selected area and said exhaust passage has a minimum transverse section with an area greater than the selected area of said exhaust outlet, said axial centerline of said second portion of said exhaust port contacting a peripheral portion of said exhaust valve seat and said second portion having gradual bends formed therein.

10. The improvement as defined in claim 9 wherein said intake inlet has a selected area and said intake passage has a minimum transverse section with an area greater than the selected area of said intake inlet, said intake passage includes a velocity increasing restriction adjacent said intake inlet, and said restriction further defined as a curved surface blending the intersection of said first intake passage portion with said second intake passage portion.

11. The improvement as defined in claim 1 wherein said first angle is an angle of about 55°-58°, said axial centerline of said second portion of said exhaust port contacting a peripheral portion of said exhaust valve seat and said second portion having gradual bends formed therein.

12. The improvement as defined in claim 11 wherein said second angle is an angle of about 85°-88°.

13. The improvement as defined in claim 12 wherein said exhaust outlet has a selected area and said exhaust passage has a minimum transverse section with an area greater than the selected area of said exhaust outlet.

14. The improvement as defined in claim 13 wherein said intake inlet has a selected area and said intake passage has a minimum transverse section with an area greater than the selected area of said intake inlet.

15. The improvement as defined in claim 14 wherein said intake passage includes a velocity increasing restriction adjacent said intake inlet, said restriction further defined as a curved surface blending the intersection of said first intake passage portion with said second intake passage portion.

16. The improvement as defined in claim 15 wherein said line of said axes is spaced from said diameter of said circular piston area a distance allowing poppet valves in said head to open at said diameter of said circular piston area.

17. The improvement as defined in claim 16 wherein said spark plug receiving bore in said gradually contoured surface section is shaped to prevent any substantial surface indentation.

18. The improvement as defined in claim 15 wherein said inserts are received in a machined groove around said inlet and outlet and means for controlling the compression ratio caused by said head by changing the depth of said grooves said controlling means being the only effective means to control the compression ratio.

19. The improvement as defined in claim 18 wherein said inserts are received in a machined groove around said inlet and outlet and means for controlling the compression ratio caused by said head by changing the depth of said grooves, said controlling means being the only effective means to control the compression ratio.

* * * * *